United States Patent [19]

Lukkarinen et al.

[11] Patent Number: 5,319,529
[45] Date of Patent: Jun. 7, 1994

[54] CLIPPED ON MARKER FOR USE WITH ADJUSTMENT LINKAGE FOR A VEHICLE HEADLAMP

[75] Inventors: Mark Lukkarinen, Merrimack; Charles M. Coushaine, Rindge, both of N.H.

[73] Assignee: GTE Products Corporation, Danvers, Mass.

[21] Appl. No.: 890,999

[22] Filed: May 29, 1992

[51] Int. Cl.$^5$ .............................................. F21M 3/20
[52] U.S. Cl. ........................................ 362/66; 362/80; 362/428
[58] Field of Search ................... 362/66, 80, 287, 289, 362/61, 428

[56]  References Cited

U.S. PATENT DOCUMENTS

| | | | |
|---|---|---|---|
| 4,574,334 | 3/1986 | Igvrot | 362/66 |
| 4,674,018 | 6/1987 | Ryder et al. | 362/424 |
| 4,731,707 | 3/1988 | McMahan et al. | 362/66 |
| 5,068,769 | 11/1991 | Umeda et al. | 362/61 |
| 5,070,433 | 12/1991 | Zillgitt et al. | 362/66 |
| 5,079,676 | 1/1992 | Lisak | 362/66 |
| 5,091,829 | 2/1992 | Hendrischk et al. | 362/66 |
| 5,197,794 | 3/1993 | Scott et al. | 362/80 X |
| 5,197,799 | 3/1993 | Dehaene | 362/428 X |

FOREIGN PATENT DOCUMENTS 2109082  5/1983  United Kingdom ................. 362/66

Primary Examiner—Carl D. Price
Attorney, Agent, or Firm—William E. Meyer

[57]  ABSTRACT

An marker for an adjustment linkage for vehicle headlamp may be made from a cover holding a marker gear having an internal gearing. The cover includes a pivot point, and a snap hole that clips over a bolt head on a rotatable link. The cover is then clipped to the bolt head but can pivot the bolt head between two positions. A marker gear with an internal gear is meshed to the linkage gear, while being held by the cover. The marker may then be zeroed when in a disengaged state, and pivoted to engage the adjustment linkage and thereby register degree changes when the adjustment linkage is rotated. The adjustment linkage is designed to be operated by a Philipshead screwdriver used as a gearing. No permanent gear box is formed in the linkage. A minimal linkage is formed that is accessible from the top of the headlamp module by the length of the screw driver. The adjustment linkage is water sealed to accommodate rotation and pivoting of the linkage.

7 Claims, 5 Drawing Sheets

CLIPPED ON MARKER FOR USE WITH ADJUSTMENT LINKAGE FOR A VEHICLE HEADLAMP

TECHNICAL FIELD

The invention relates to headlamps and particularly to an adjustment assembly for headlamps. More particularly the invention is concerned with a marker for use with a hand operated drive adjustment for vehicle headlamps.

BACKGROUND ART

To properly direct the forward beam, headlamps need to be adjusted. With headlamps, and the available space under the vehicle hood becoming smaller, the adjustment mechanism needs to become both more accurate and less bulky, and the associated access space needs to be minimized. Existing headlamp adjustments include a variety of shaft and gear linkages. By turning an end of the linkage, a threading advances or retracts a reference point of the headlamp module. The headlamp module then pivots, thereby redirecting the forward beam. An advantage to the shaft and gear type linkage is that direct access to the back of the headlamp is no longer necessary. The rear facing linkage can be brought up ninety degrees, so the linkage ends near the top rear of the headlamp. The adjustment can then be made from the top of the headlamp. Nonetheless, vehicle manufacturers would prefer to eliminate the shaft and gear linkages, as they still take up space. There is then a need for an adjustment linkage for vehicle headlamp that minimizes the associated access volume.

There are a number of other problems with the shaft and gear type linkage. Primarily, there are too many components, which means the materials, and assembly costs are high, and there are more elements that may be defective, or fail. There is then a need to reduce the number of elements in the adjustment linkage. Hands, tools or parts tend to rest on or hit the top end of the linkage. The hand, tool, part or linkage may then be damaged. There is then a need to remove the top exposed linkage.

Commonly, a headlamp module is mounted on a backplate that is bolted to the vehicle. The headlamp then pivots with respect to the backplate. The headlamp as a whole moves with respect to the vehicle, hereby upsetting water seals, and tight finish lines around the headlamp. To avoid these results, headlamps are now being made with a housing enclosing an adjustable internal reflector. The housing is bolted to the vehicle, while the reflector inside may be aimed independently of the housing. The adjustment linkage must then pass from the exterior through the housing to couple with the internal reflector. The same adjustment linkage problems as described before must still be overcome, but also, to lessen or prevent the likelihood of the housing interior from fogging up, a water seal must now be included in the length of the adjustment linkage. There is then a need for a simple, compact, water sealed adjustment linkage for use in vehicle headlamps.

A further problem is to be able to aim the headlamp after it has been dismounted. Currently, headlamps are being designed that include bubble type levels, and other types of leveling and marking items. The threaded adjusters usually require several turns of the threading to bring the headlamp module into proper fine tune, but two or three threadings of the adjustment linkage is only a small distance along the adjustment shaft, too small to be accurately judged by most humans. There is then a need for scaling the number of threadings to a convenient beam angle measurement for human detection. Since, the scaling mechanism must be initially set during factory assembly, and potentially reset during regular maintenance or repair, there must be zeroable feature to the scale.

Examples of the art shown in U.S. patents include:

U.S. Pat. No. 4,574,334 issued to Kenkichi Igura on Mar. 4, 1986 for a Device for Adjusting the Inclination of the Light Axis of Headlamps of a Motor Vehicle shows a pivoted headlamp assemble, with a threaded shaft driver. A hand knob is shown coupled to a gearing that threads the adjustment shaft in and out.

U.S. Pat. No. 4,674,018 issued to Francis E. Ryder et al on Jun. 16, 1987 for a Head Lamp Adjusting Mechanism shows a pivoted headlamp adjusted by a driven threaded shaft. A Right angle coupling is shown with a gear box coupling between two permanent shafts is shown.

U.S. Pat. No. 4,731,707 issued to David R. McMahan on Mar. 15, 1988 for a Vehicle Headlamp Assembly shows a pivoted headlamp adjusted by a driven threaded shaft. The drive mechanism includes two permanent shafts coupled at right angles by a gearbox type coupling.

U.S. Pat. No. 5,068,769 issued to Toru Umeda et al on Nov. 26, 1991 for a Horizontal Sighting Adjustment linkage for Head-Lamps shows a pivoted headlamp adjusted by a driven threaded shaft. The drive mechanism includes a thumb wheel that turns a gear coupled to the adjustment shaft.

U.S. Pat. No. 5,070,433 issued to Ulrich Zillgitt et al on Dec. 3, 1991 for a Headlight for a Motor Vehicle having an Adjustable Motor-Driven Reflector shows a geared motor drive for automatically adjusting the headlamp aiming.

DISCLOSURE OF THE INVENTION

A marker for use with adjustment linkage for a vehicle headlamp reflector may be formed from a rotatable adjustment shaft having an axis, and coupled to an adjustment linkage for a vehicle headlamp, the shaft having a small gearing coupled thereto, and having a rotational contact coupled thereto. A cover plate coupled to a mechanical ground, and having an engagement hole formed is positioned with the rotational contact of the shaft in the engagement hole. The cover plate further includes a coupling means to hold a rotatable gear. The marker also includes a rotatable marker gear having a gearing engaged with the shaft gear, having means for indicating the marker gear position relative to the cover while the marker gear is held by the cover whereby rotation of the adjustment shaft causes the marker gear to rotate indicating a change in position by the adjustment shaft.

BEST MODE FOR CARRYING OUT THE INVENTION

Figure 1:
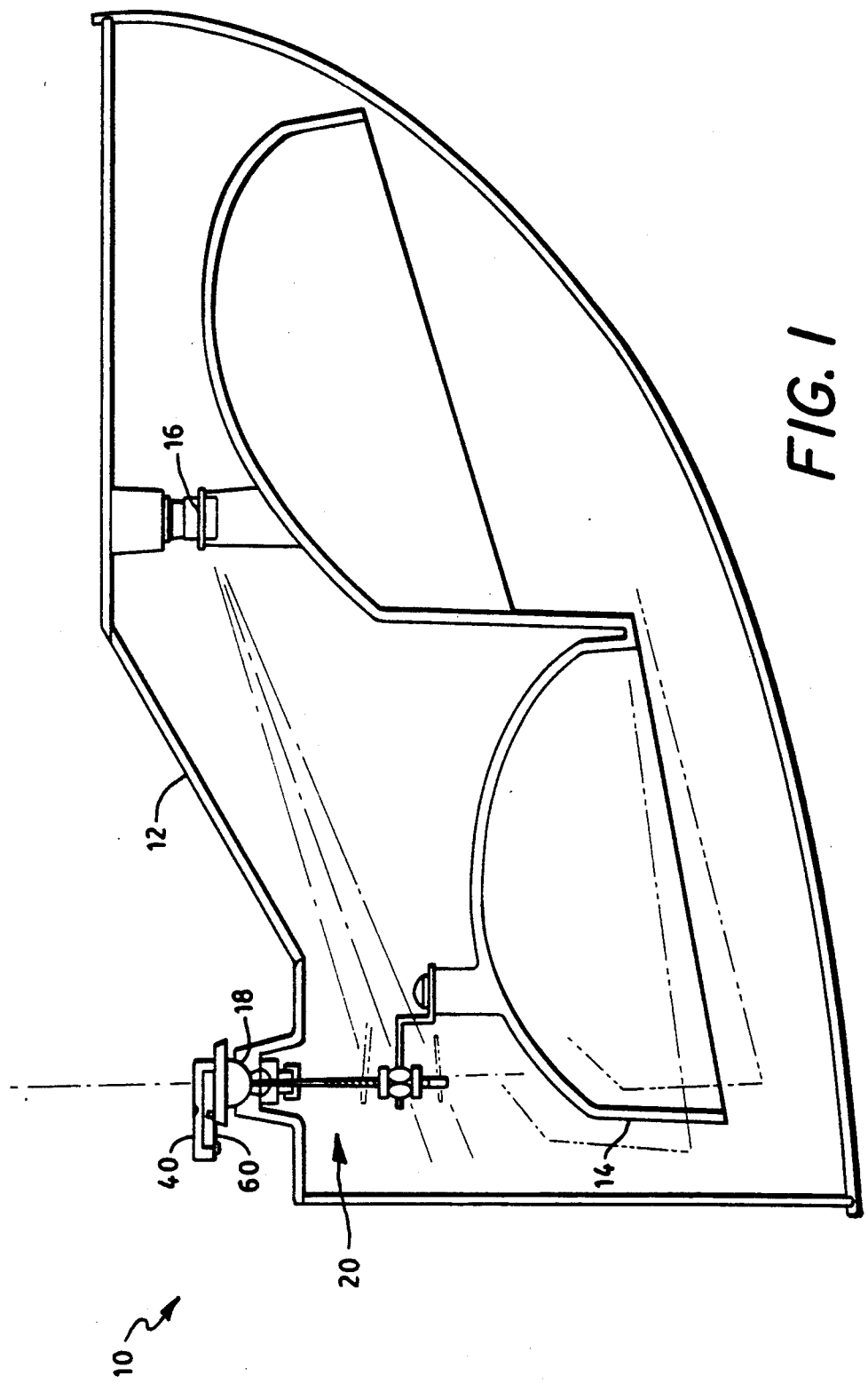
FIG. 1 shows a top schematic view of an example headlamp module with an external housing, an internal reflector and an adjustment linkage.

FIG. 1 shows a top schematic view of an example headlamp module 10 with an external housing 12, an internal reflector 14, and an adjustment linkage. The housing 12 supports one end of the reflector 14 by a pivot point 16. The housing 12 also includes a vertical reference point (not shown) and a horizontal reference point 18 from which an adjustment linkage 20 extends to the support the other end of the reflector 14. By adjusting the length of the adjustment linkage 20, the reflector may be pivoted right and left, thereby aiming the reflector 14 and forward beam. FIG. 1 shows this conceptual arrangement for the horizontal adjustment.

Figure 2:
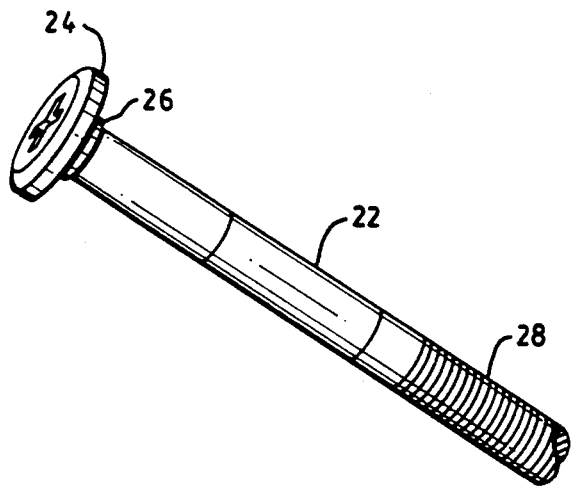
FIG. 2 shows a preferred embodiment of an adjustment shaft, broken away.
Figure 5:
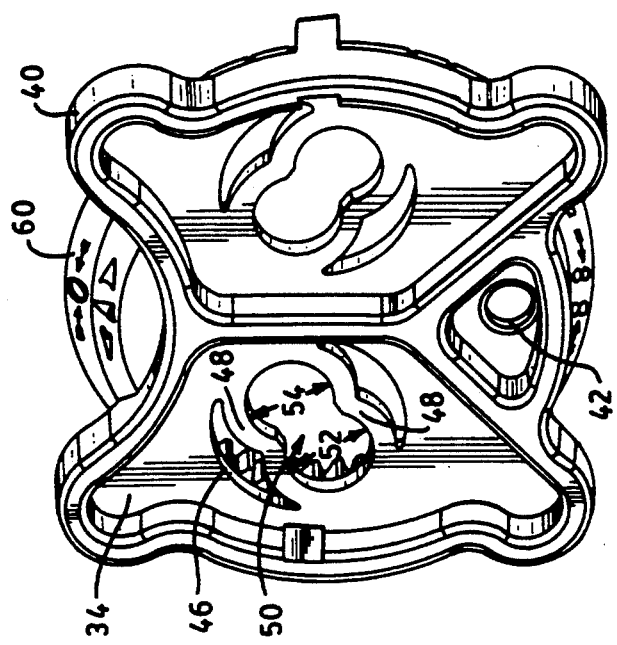
FIG. 5 shows a front side of a preferred embodiment of a cover and marker gear.

FIG. 2 shows a preferred embodiment of an adjustment shaft 22. The adjustment shaft 22 may be a steel shaft with a bolt head 24 on one end, a spacer 26 adjacent the bolt head 24 and a threaded end 28 on the opposite end of the shaft. It is convenient to form the bolt head 24 with a secondary means for turning the adjustment shaft 22, such as a screwdriver slot. The spacer 26 is formed to have the same or slightly larger axial length as the thickness of a cover 40 (FIG. 5). The preferred spacer 26 is a cylindrical section to ease rotational coupling between the spacer 26 and cover 40. The spacer 26 has a greater diameter than the adjacent shaft, thereby forming a shoulder to block the advance of a gear head 30. The spacer 26 may be optionally formed as part of the gear head.

Figure 3:
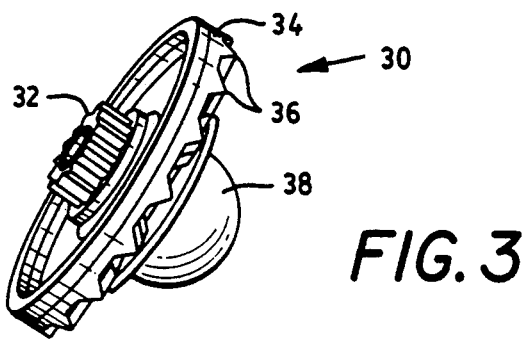
FIG. 3 shows a preferred embodiment of a gear head.

FIG. 3 shows a preferred embodiment of a gear head 30. While the adjustment shaft 22 and gear head 30 could be formed as a single piece, Applicants find it convenient to form the adjustment shaft 22 and gear head 30 as separate pieces, and then press fit the two together. For the present invention, the gear head 30 includes a small gearing 32 to be adjacent the spacer 26. Preferably, the small gearing 32 is as small as is practical, and still includes a center passage, so the small gearing 32 may be press fitted to the adjustment shaft 22 adjacent the spacer 26. In the preferred embodiment, the gear head 30 further includes a plate 34 with gear teeth 36 aligned radially, on the side of the plate 34 to face the threaded end 28, and includes a ball 38 section, whereby the adjustment shaft 22 may be located in a ball socket. Where the chosen rotatable tool 82 (FIG. 9) is a Philipshead screw driver, the gear teeth 36 are chosen to mate with the teeth 36 of the Philipshead screw driver. The preferred gear head 30 has about sixteen gear teeth 36 designed to mated with a standard Philipshead (size 2) screw driver. Adjacent the gear head 30 is a section of a sphere, or ball 38 coaxial with the adjustment shaft 22 and having substantially the same diameter as does the ball socket 74 (FIG. 9), so the ball socket 74 and ball 38 may be mated.

Along the opposite end of the adjustment shaft 22 is a threaded end 28. The threaded end 28 is designed to couple with a threaded coupler 104 (FIG. 9) positioned on a pivotable vehicle reflector 14. Threaded headlamp couplers are commonly nylon, or similar plastic pieces that fit in a metal bracket. The threaded end 28 then has threading that is appropriate for threading to a plastic piece, and for repeated threaded adjustment therewith.

Figure 4:
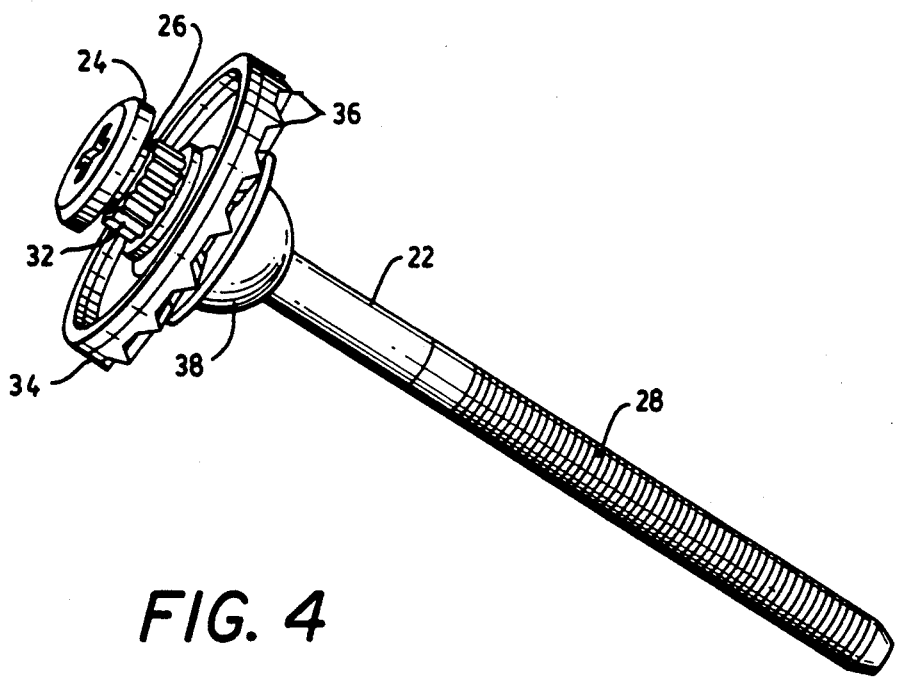
FIG. 4 shows a combination of the preferred embodiments the adjustment shaft and gear head.

In the preferred embodiment, the gear head 30 is formed as separate cast gear including the plate 34, gear teeth 36 and ball 38. The preferred gear head 30 includes a center passage so the adjustment shaft 22 may be press fitted to the gear head 30 with the small gearing 32, plate 34 with gear teeth 36 and ball 38. The small gearing 32 is then offset from the bolt head 24 by the spacer 26, while the radial teeth 36 and ball 38 face the threaded end 28 of the shaft. FIG. 4 shows the combined adjustment shaft 22 and the press fitted gear head 30.

Figure 8:
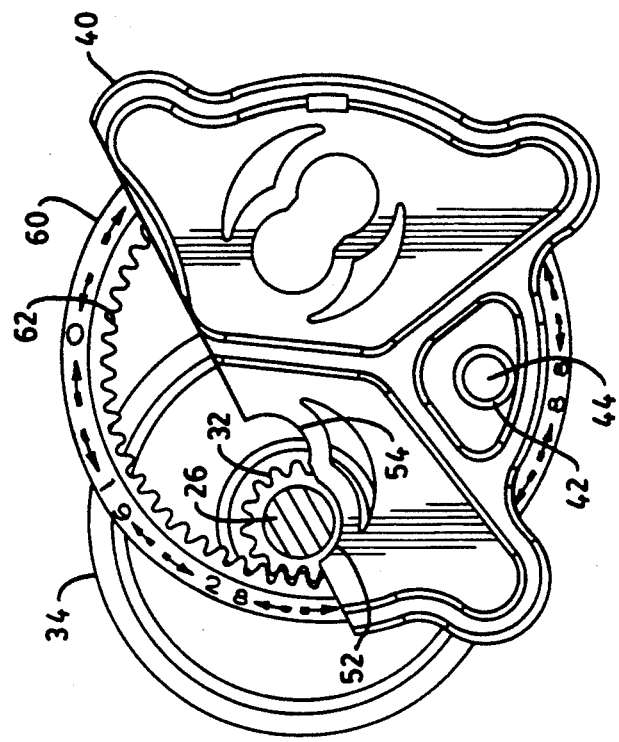
FIG. 8 shows an end view of a cover (broken away) and marker gear in an engaged relation to an adjustment shaft (cross section).
Figure 7:
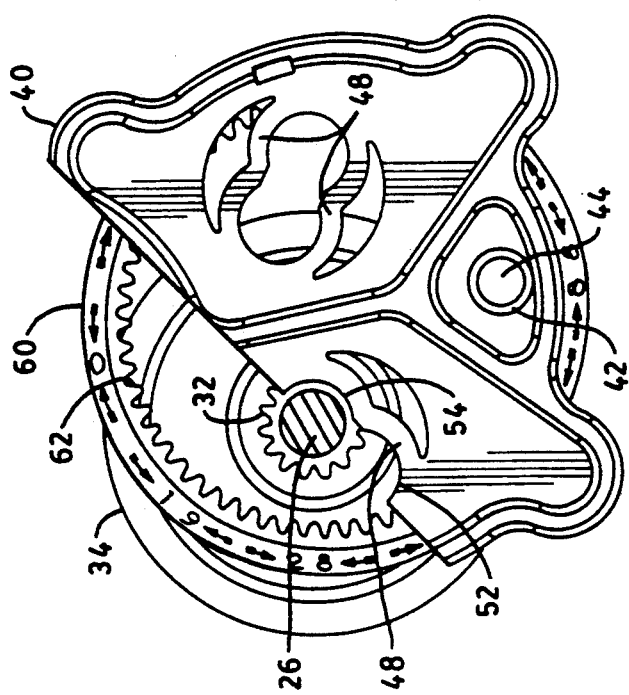
FIG. 7 shows an end view of a cover (broken away) and marker gear in a disengaged relation to an adjustment shaft (cross section).

FIG. 5 shows a front side of a preferred embodiment of a cover 40 clipped to a marker gear 60. The cover 40 comprises a cover plate 34 with a means for clipping over the bolt head 24 to the spacer 26, allowing rotation of the adjustment shaft 22 with respect to the cover 40. The cover 40 is also formed with a slide or pivot means, so the cover 40 may be shifted in a plane transverse to the adjustment shaft. The preferred cover 40 is formed with a circular pin hole 42 having sufficient size to snugly but rotatably mount to a pin 44 extending from the housing 12 to form the pivot means (FIGS. 7, 8). In the preferred embodiment, a cover bolt hole 46 is formed in the cover 40 having a diameter greater than the smallest diameter of the bolt head 24. Two flexible spring arms 48 are formed to cross the cover bolt hole 46 in a roughly parallel fashion. The length of each spring arm 48 is further formed to define portions of perimeters of two adjacent positioning holes. The cover 40 and spring arms 48 then define a hole 52 with an engaged position section 52 near the periphery of the cover 40, and a disengaged position section 54, nearer the center of the cover 40. The engaged position hole 52 and the disengaged position hole 54 are roughly tangent or overlap each other, are equidistant from the cover pivot such as pin hole 42 and have diameters equal to or slightly larger than the diameter of the spacer 26. The engaged position hole 52 and disengaged position hole 54 are otherwise formed to retain the spacer 26, and open to each other to allow the spacer 26 to be shifted, or snapped from the engaged position hole 52 to the disengaged position hole 54 and back again by rotating the cover 40 on the pivot pin 44. In the preferred embodiment, the two bolt head 24 hole structures are formed symmetrically with respect to the positioning pin hole 42. The cover 40 may then be used interchangeably in a rightside or a leftside headlamp.

Figure 6:
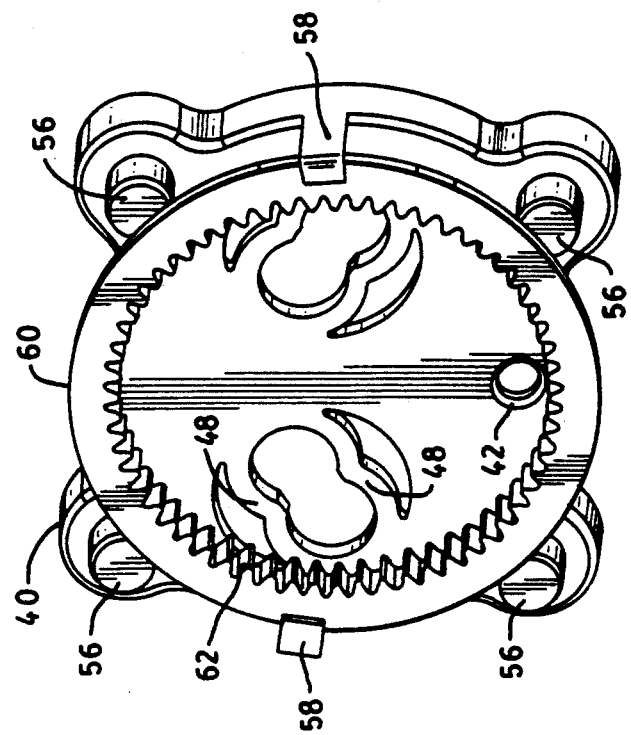
FIG. 6 shows a back side of a preferred embodiment of a cover and marker gear.

FIG. 6 shows a back side of a preferred embodiment of a cover 40 holding a marker gear 60. The rear side of the cover 40 is formed to hold and guide a rotatable marker gear 60. In the preferred embodiment, the rear cover 40 face is rotationally conformal with the forward face of the marker gear 60, and includes four similar positioning posts 56 positioned equal angularly around the marker gear 60 to be peripherally tangent to the marker gear 60. Two snap clips 58 are also formed in the rear face of the cover 40. The two snap clips 58 may extend from the rear of the cover 40, on either side of the marker ring 60 to be positioned across from each other by about the diameter of the marker gear 60. The two snap clips 58 may have claws that snap over the marker gear 60 to thereby hold the marker gear 60 close to the rear face of the cover 40, but not so tightly that the marker gear 60 cannot be rotated with respect to the cover 40. The cover 40 is otherwise cut away or formed to expose either a front side, or an outer diameter side of the marker gear 60.

The marker gear 60 held by the cover 40 may include a circularly shaped, slidable periphery. The outer diameter is preferably marked with appropriate direction and degree indicators to indicate or assist in reading the headlamp position. The peripheral surface of the marker gear 60 may then clip to and abut the rear cover 40 face, and still be rotatable with respect to the cover 40. The indicators are exposed by the cover 40 formation to be readable by a user. The inner diameter of the marker gear 60 is formed with a internal gearing 62 mateable with the adjustment shaft 22 small gearing 32. To maximize the step down gearing between the small gearing 32 and the marker gear 60, the small gearing 32 should be as small as possible, while the marker gear 60 should be as large as practicable. Several full rotations of the adjustment shaft 22 then rotate the marker gear 60 a conveniently scaled number of degrees that may be read from the exterior of the marker gear 60.

FIG. 7 shows an end view of a cover 40 and marker gear 60 in a disengaged relation to an adjustment shaft 22. The cover 40, and marker gear 60 may be clipped over the bolt head 24, so the spacer 26 is captured by the spring arms 48 in the disengaged position hole 52. The cover 40 is also engaged with the pivot hole 42 filled by pivot pin 44. In this disengaged state, the marker gear 60 is free to rotate with respect to the adjustment shaft 22, small gearing 32, and cover 40, and may therefore be repositioned, or zeroed with respect to the cover 40. Where the reflector 14 has already been properly aligned, the disengaged marker gear 60 may be set to a zero position. The friction provided by the rear of cover 40, positioning posts 56, and snap clips 58, 58 then hold the marker gear 60 securely in place.

FIG. 8 shows an end view of a cover 40 and marker gear 60 in an engaged relation to an adjustment shaft 22. By pivoting the cover 40 on the pivot pin 44, the cover 40 may be snapped from the disengaged position to the engaged position with the spacer 26 repositioned in the engaged position hole 52. The small gearing 32 is now meshed with the marker gear 60. Rotation of the adjustment shaft 22 to reposition the reflector 14, causes the small gearing 32 to turn the marker gear 60 with reference to the cover 40. The change in the reflector 14 position can then be read according to the change in the marker gear 60.

Figure 9:
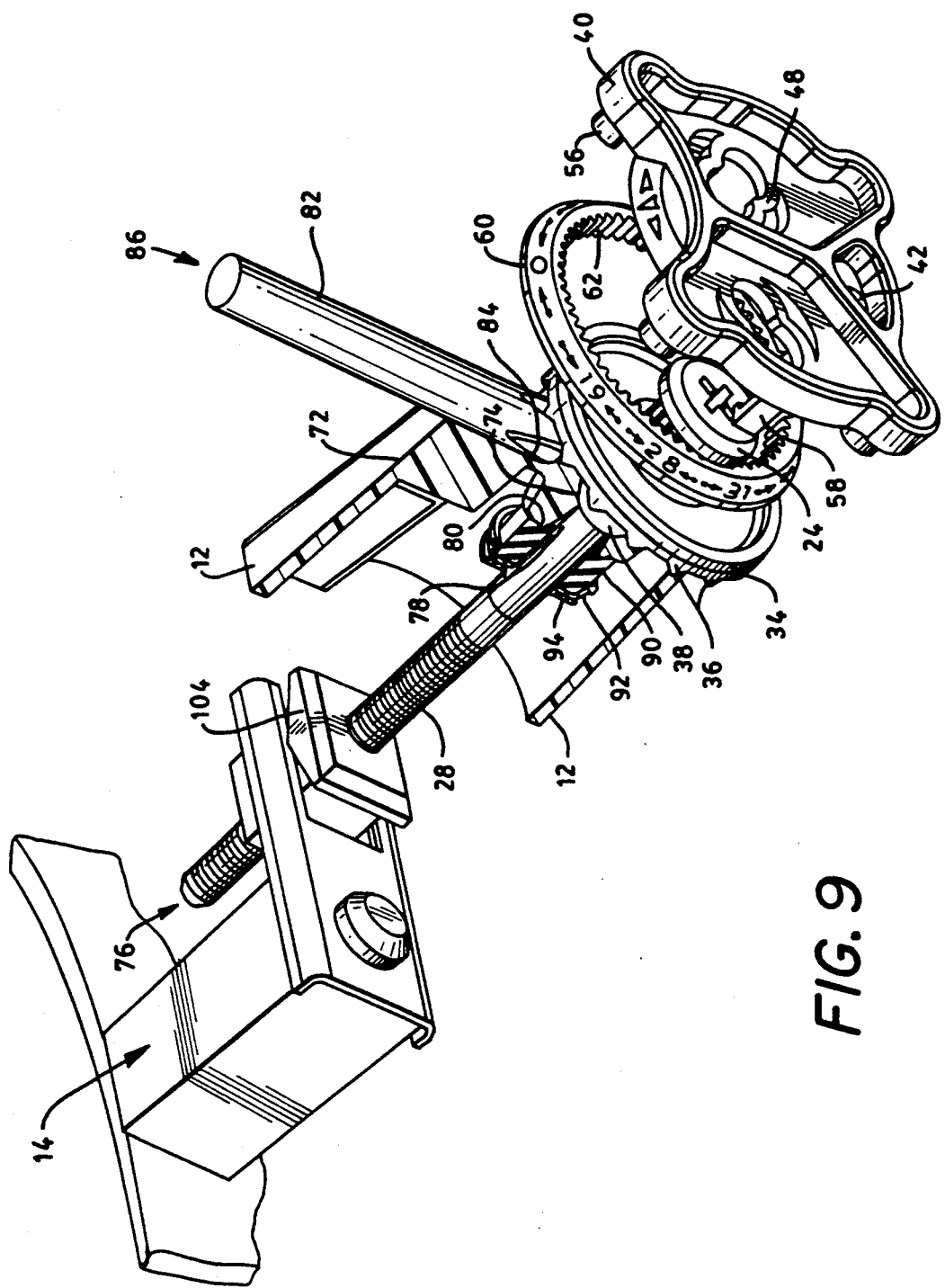
FIG. 9 shows a preferred adjustment linkage, partially in cross section, partially broken away and partially exploded.

FIG. 9 shows a view of a preferred adjustment linkage, partially in cross section, partially broken away, and partially exploded. The adjustment linkage 20 for vehicle headlamp is assembled from a housing coupler 72, an adjustment shaft 22, rubber grommet 90, a cup 92, a lock washer 94, and a threaded holder 104 for coupling to a pivotable reflector 14. The housing coupler 72 may be made out of metal or plastic, and is conveniently formed as a molded portion of the housing 12. The preferred housing coupler 72 includes a means for supporting a rotatable shaft, and an external wall defining a channel for a rotatable tool. The housing coupler 72 provides a stable reference point from which the adjustment linkage 20 may adjustably extend from.

The preferred means for supporting the shaft 22 is cylindrical through passage defined by a wall portion of the housing coupler 72. In the preferred embodiment, positioned along housing coupler 72 in an exterior end of the shaft passage is a ball socket 74. The shaft passage then extends along a shaft axis 76 through a portion of the housing coupler 72 to an interior end. The shaft passage for the portion from the ball socket 74 to the interior end is formed to allow pivoting of the shaft 22, and the preferred embodiment the interior end of the shaft passage is a cone 78, with the wide end of the conic passage facing the reflector 14 with the geometric center of the ball 38 of the ball socket 74 at the geometric peak of the cone 78. In the preferred embodiment, the shaft passage is then angled, or flared open from the base of the ball socket 74, to allow pivoting of a shaft 22 in the shaft passage. Alternatively, if the reflector 14 is pivoted on several other points, and the ball and ball socket, then the reflector 14 may sag. To avoid this the ball 38, and ball socket 78 structures may be replaced by conformal conic sections, and the conic flare of the shaft passage may be made conformal with the adjustment shaft 22. The adjustment shaft 22 would then not longer be able to pivot, thereby reducing the potential for reflector sag.

The preferred housing coupler 72 also includes a means for enhanced sealing to the rubber grommet 90, or similar such seal, such as a rib 80, groove, or similar surface feature that encircles the interior end. The preferred housing coupler 72 includes a rib 80 formed around the interior end that a rubber grommet 90 may be coupled to.

The housing coupler 72 may also include a wall defining a tool channel for a rotatable tool 82. The preferred rotatable tool 82 is a standard Philipshead screw driver. The preferred rotatable tool 82 then has a relatively long cylindrical shaft portion with a set of tool teeth 84 evenly distributed about the end of the rotatable tool 82, and facing both toward a forward end of the tool 82 and to the side of the tool 82. The tool channel wall is designed to conform with at least a portion of the surface of rotation of the tool 82. The tool channel wall may then act as a guide and support for the tool 82. For the preferred tool 82, a Philipshead screw driver, the tool channel may then be an axial section of a circular cylinder. The rotatable tool 82 may then be held in position against the housing coupler 72 while being rotated about a tool axis 86 of the rotatable tool 82. The shaft axis 76, and tool axis 86 are aligned to intersect, and preferable aligned to intersect at right angles. The exterior end and the wall defining the tool channel then join near the intersection of the shaft axis 76 and the tool axis 86.

Adjacent the interior end of the preferred embodiment, coupled to the circular locating rib 80, and positioned on the adjustment shaft 22 is an elastic or rubber positioning grommet 90 or bushing. The grommet 90 may in turn be held in a cup 92, and lock washer 94 assembly that may also be positioned on the adjustment shaft 22. The rubber grommet 90 is then compressible between the interior end and the cup 92 and washer 94 assembly. If the shaft ball 38 pivots in the ball socket 74, the adjustment shaft 22 pivots, compressing the rubber grommet 90 transverse to the shaft axis 76, while still sealing between the housing coupler 72 and the adjustment shaft 22. If the distance between the tool channel and gear teeth 36 becomes shortened due to the pivoting of the adjustment shaft 22, the grommet 90 may be compressed slightly during tool rotation, thereby providing relief to the tool and gear interaction. The adjustment linkage may then be moved for proper reflector 14 positioning, while the shaft seal provided by grommet 90 prevents water or vapor from leaking into the housing. The friction of the compressed grommet 90 further retains the adjustment shaft 22 in proper position once the adjustment is made.

In a proposed design some of the dimensions were approximately as follows: The housing coupler would be made of a plastic, such as polycarbonate, and have a means for coupling to a vehicle, and a means for supporting a rotatable adjustment shaft. The wall defining a channel for size 2 Philipshead screw driver would be an axial half section of a circular cylinder formed on the rear exterior of the housing. The cylinder diameter would be about 5.0 millimeters, and the wall length would be about 10.0 millimeters. The inside portion of the exterior shaft passage end of the shaft passage would be formed as a section of a sphere having diameter of about 10.0 millimeters. The shaft passage would be about 5.0 millimeters long, and have a narrowest diameter of about 4.0 millimeters. Formed on the exterior of the housing coupler, around the interior shaft passage end of the shaft passage would be a rib about 1.0 millimeters high, and 7 millimeters in diameter. The adjustment shaft would be made of steel. The gear would be formed as a separate piece cast from a zinc alloy with a plate diameter of about 20.0 millimeters. Sixteen teeth would be formed along the perimeter, and radially on one side of the gear. The gear teeth would be about 1.5 millimeters high, and would be designed to rotationally mate with a size 2 Philipshead screw driver. The gear would be press fitted to an adjustment shaft. The shaft would be about 10.0 centimeters long, with threads formed in the end opposite the geared end. The adjustment shaft would be threaded through the shaft passage so the gear teeth were positioned adjacent the tool channel, and the ball portion of the adjustment shaft, mated with the ball socket of the shaft passage. A rubber bushing would then be slid over the threaded end of the adjustment shaft and butted against interior shaft passage end of the shaft passage, mating with the formed rib. A metal cup and clamping washer would then in turn be slid over the adjustment shaft to hold adjustment shaft tightly in the shaft passage with the ball pressed against the socket. The threaded end of the adjustment shaft would then be threaded to a nylon piece held in a bracket coupled to the lighting module.

While there have been shown and described what are at present considered to be the preferred embodiments of the invention, it will be apparent to those skilled in the art that various changes and modifications can be made herein without departing from the scope of the invention defined by the appended claims. In particular, while horizontal scheme is shown in FIG. 1, and a vertical scheme is shown in FIG. 2, it should be apparent that the geared driver linkage may be adapted to both vertical and horizontal adjustments. Also, headlamp modules in general may be coupled to vehicles by appropriate bracketing.

We claim:

1. A marker for use with adjustment linkage for a vehicle headlamp reflector comprising:

a) a rotatable adjustment shaft having an axis, and coupled to an adjustment linkage for a vehicle headlamp, the shaft having a small gearing coupled thereto, and having a rotational contact region formed thereon, b) a cover plate coupled to a mechanical ground, the cover plate having an engagement hole formed therein with the rotational contact of the shaft positioned in the engagement hole, and the cover plate having coupling means to support a rotatable marker gear, and c) a rotatable marker gear supported by the cover plate, having a gearing engaged with the shaft small gearing, having means for indicating the marker gear position relative to the cover plate whereby rotation of the adjustment shaft causes the marker gear to rotate relative to the cover plate indicating a change in position of the adjustment shaft.

2. The marker apparatus in claim 1, wherein the adjustment shaft includes a bolt head offset from the small gearing by a coaxial spacer forming the rotational contact.

3. The marker apparatus in claim 1, wherein the small gearing is a coaxial segment of the adjustment shaft.

4. The marker apparatus in claim 1, wherein the cover plate is pivotally coupled to a mechanical ground.

5. The marker apparatus in claim 1, wherein the cover plate engagement hole is formed to include an engagement position, and a disengagement position, with each position sufficient to contain the rotational contact, and the cover plate coupling to the mechanical ground allows the cover plate to be shifted in a plane transverse to the shaft axis at the contact position, in a direction away from the small gearing and toward the marker gear, whereby the cover plate and marker gear may be shifted from engagement with the rotational contact in the engagement position to engagement with the rotational contact in the disengaged position, thereby disengaging the marker gear from the small gearing.

6. The marker apparatus in claim 1, wherein the cover plate is pivotally coupled to the mechanical ground to pivot in a plane transverse to the adjustment shaft at the contact point, and the engagement position hole is formed with an extension therein extending in a direction cocircular about the mechanical ground, and away from the small gearing, and large enough to accept the contact position at least to a depth equal to or greater than the depth of the gear meshing between the small gearing and marker gear, whereby the cover plate and marker gear may be pivoted away from the small gearing to a position of disengagement with the small gearing.

7. The marker apparatus in claim 1, wherein the bolt head has a diameter greater than the adjacent shaft, and the cover plate hole includes a compressible periphery portion having a diameter less than or equal to the diameter of the bolt head, whereby the compressible periphery may be compressed to allow the cover plate to be pressed over the bolt head, and the compressible periphery portion may then uncompress to thereby be latched to the bolt head.

* * * * *